(12) United States Patent
Bennett et al.

(10) Patent No.: US 10,752,332 B2
(45) Date of Patent: Aug. 25, 2020

(54) FAIRING INTEGRATING WITH OUTER MOLD LINE AND PROTECTIVE PORTIONS

(71) Applicant: Bell Helicopter Textron Inc., Fort Worth, TX (US)

(72) Inventors: Jon Damon Bennett, W. Melbourne, FL (US); Joshua Allan Edler, Dallas, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 507 days.

(21) Appl. No.: 15/665,627

(22) Filed: Aug. 1, 2017

(65) Prior Publication Data

US 2019/0039713 A1 Feb. 7, 2019

(51) Int. Cl.
| | |
|---|---|
| *B64D 29/00* | (2006.01) |
| *B64D 29/02* | (2006.01) |
| *B64D 29/04* | (2006.01) |
| *B64D 29/08* | (2006.01) |
| *B64C 7/00* | (2006.01) |
| *B64C 7/02* | (2006.01) |
| *B64C 1/38* | (2006.01) |
| *B64C 1/14* | (2006.01) |
| *B64D 29/06* | (2006.01) |
| *B64C 27/04* | (2006.01) |
| *B64C 1/06* | (2006.01) |

(52) U.S. Cl.
CPC .............. *B64C 1/1446* (2013.01); *B64C 7/00* (2013.01); *B64C 7/02* (2013.01); *B64D 29/00* (2013.01); *B64D 29/04* (2013.01); *B64D 29/06* (2013.01); *B64D 29/08* (2013.01); *B64C 1/069* (2013.01); *B64C 1/1407* (2013.01); *B64C 1/38* (2013.01); *B64C 27/04* (2013.01)

(58) Field of Classification Search
CPC ........... B64C 7/00; B64C 7/02; B64C 1/1446; B64C 1/069; B64D 29/04; B64D 29/06
USPC ........................................................ 244/119
See application file for complete search history.

(56) References Cited

U.S. PATENT DOCUMENTS

2018/0362135 A1* 12/2018 Storozuk ................. B64C 1/069

OTHER PUBLICATIONS

2016 Honda Civic, Honda; https://www.civicx.com/threads/2016-civic-chassis-cutaway-model.268/; Published Oct. 6, 2015. Accessed Jan. 17, 2020. (Year: 2015).*

(Continued)

*Primary Examiner* — Richard R. Green
*Assistant Examiner* — Steven J Shur
(74) *Attorney, Agent, or Firm* — Patent Capital Group

(57) ABSTRACT

One example of a fairing for a rotorcraft includes an outer mold line portion (OML portion) and a bearing portion extending from the OML portion. The OML portion provides at least a portion of an outer mold line of the rotorcraft. Both the OML portion and the bearing portion shield a portion of a structural member. The bearing portion can protect the portion of the structural member from damage resulting from foot traffic associated with accessing an area nearby the structural member.

19 Claims, 7 Drawing Sheets

(56) References Cited

OTHER PUBLICATIONS motortrend.com; 2016 Honda Civic; https://web.archive.org/web/20160923022002/https://www.motortrend.com/cars/honda/civic/2016/; Published Sep. 23, 2016. Accessed Jan. 17, 2020. (Year: 2016).*

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

Perry, Dominic, "Analysis: Bell 525 Relentless Cutaway and Technical Description", Flight Global, Flight International, Bell Helicopter, Published Nov. 12, 2014. (8 pages).

* cited by examiner

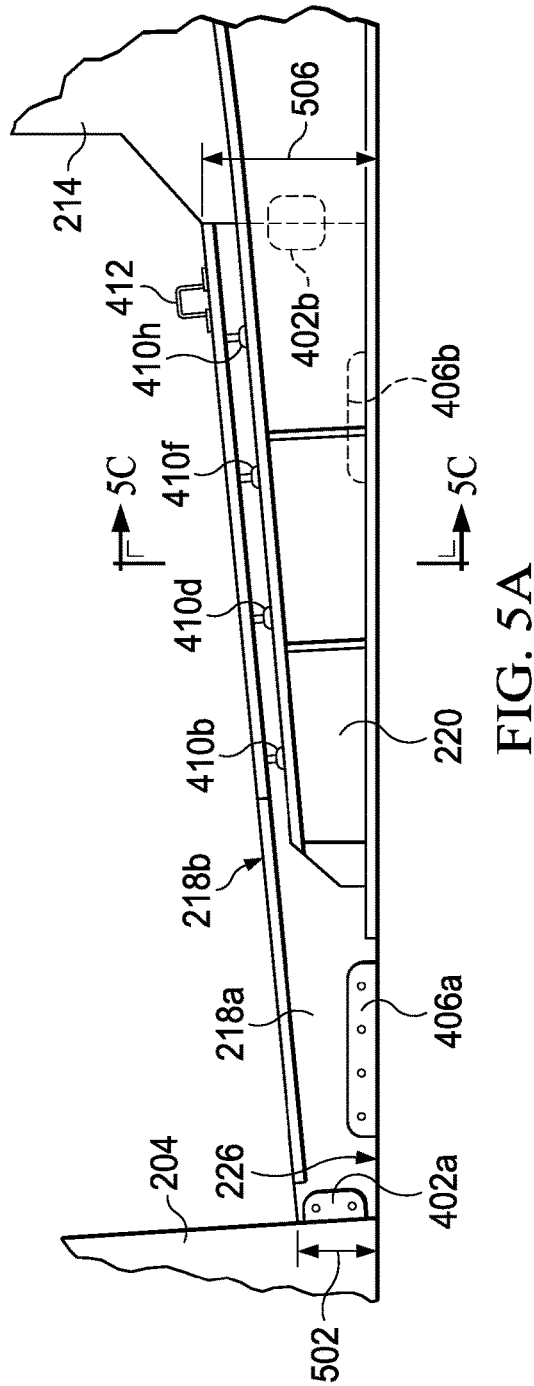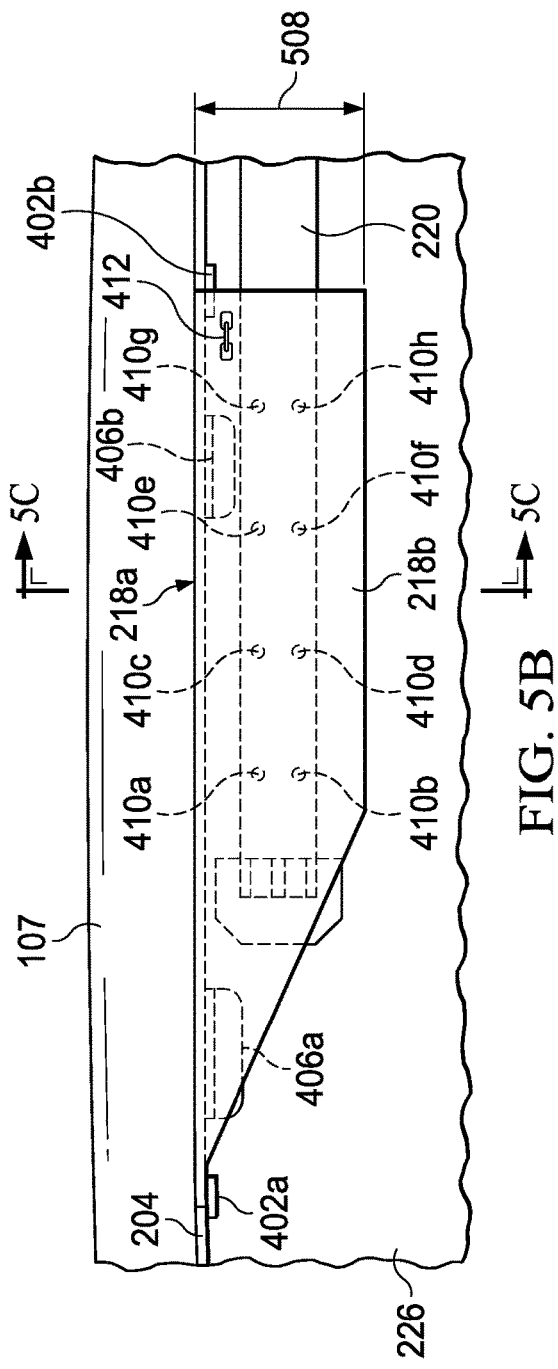

FAIRING INTEGRATING WITH OUTER MOLD LINE AND PROTECTIVE PORTIONS

TECHNICAL FIELD

This disclosure relates generally to aircraft fairings and cowlings, and more particularly, though not exclusively, to fairings and cowlings having both an outer mold line portion and a bearing portion to protect a component of an aircraft.

BACKGROUND

An outer mold line (OML) provides an aerodynamic path for air to flow around the aircraft during flight and generally comprises an outer surface of an aircraft. The OML is an aerodynamic outer surface of the aircraft that reduces aerodynamic drag. The OML comprises many contiguous surfaces of different components and/or fairings. Fairings and cowlings provide a relatively smooth outer surface that reduces aerodynamic drag experienced by the aircraft. For example, some rotorcrafts include fairing assemblies configured to protect propulsion related components, auxiliary power units (APU), and environmental control units (ECU). For example, a fairing may be used for general drag reduction, but also for providing an aerodynamic flow path from the exterior of the fairing assembly to the engine inlet engine, as well as for decorative purposes. Fairings and cowlings have, in the past, been constructed of aluminum or other light-weight metals but, more recently, are increasingly constructed from composite materials, such as carbon fiber reinforced polymer (CFRP). In some rotorcraft configurations, ECUs and internal ducts, often for cooling purposes, are arranged in a compartment underneath the fairing. The components located in the compartment underneath the fairing require occasional or periodic inspection and maintenance which necessitates at least partial removal of the fairing to access the components in the compartment.

SUMMARY

According to one aspect of the present disclosure, a fairing for a rotorcraft includes an outer mold line portion (OML portion) and a bearing portion extending from the OML portion. The OML portion provides at least a portion of an outer mold line of the rotorcraft. Both the OML portion and the bearing portion shield a portion of a structural member.

In some embodiments, the bearing portion is continuous with the OML portion.

In some embodiments, the bearing portion extends into a compartment of the aircraft in which the portion of the structural member is located.

In some embodiments, the bearing portion is configured to protect the portion of the structural member from damage resulting from foot traffic associated with accessing the compartment.

Some embodiments further comprise a strip of friction material attached to the bearing portion.

Some embodiments further comprise a fillet located at an edge of the bearing portion opposite the OML portion.

In some embodiments, the OML portion and the bearing portion shielding the portion of the structural member comprises: the bearing portion being configured to shield the structural member from a first direction; and the OML portion being configured to shield the structural member from a second direction.

In some embodiments, the structural member is a beam configured to support loads from a portion of an airframe of the rotorcraft.

In some embodiments, the bearing portion is supported, at least in part, by the structural member.

Some embodiments further comprise an attachment mechanism configured to attach the fairing to the rotorcraft.

BRIEF DESCRIPTION OF THE DRAWINGS

FIGS. 5A, 5B, and 5C illustrate further details of the example fairing of FIGS. 3 and 4.

DETAILED DESCRIPTION

Figure 1A:
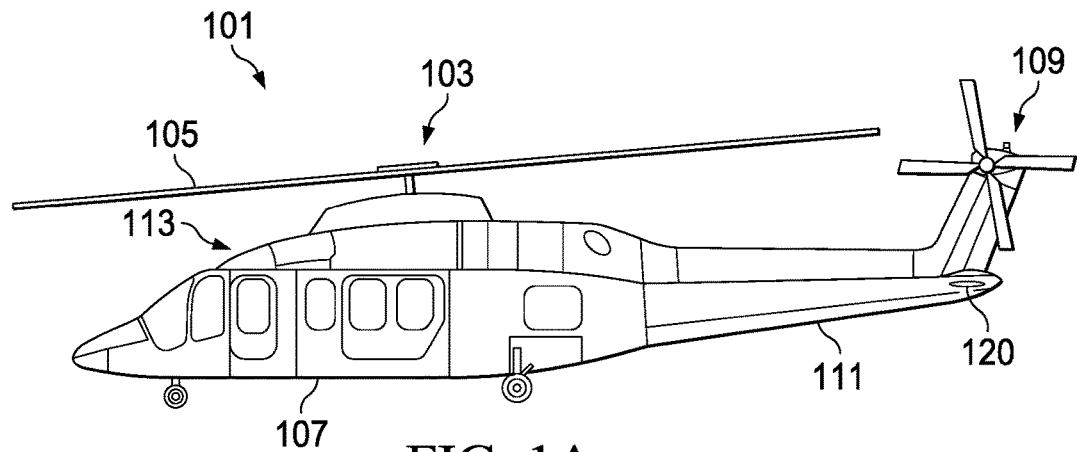
FIGS. 1A, 1B, and 1C illustrate an example embodiment of a rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, fairings, cowlings, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
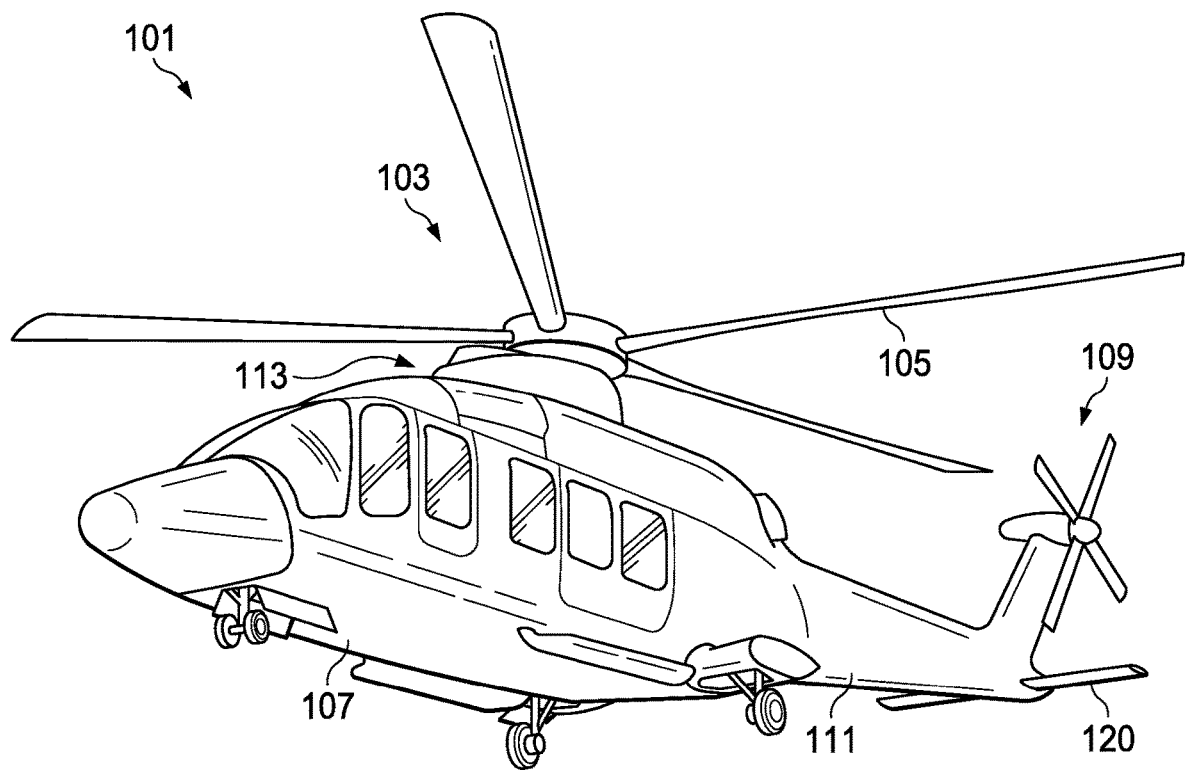
Figure 1C:
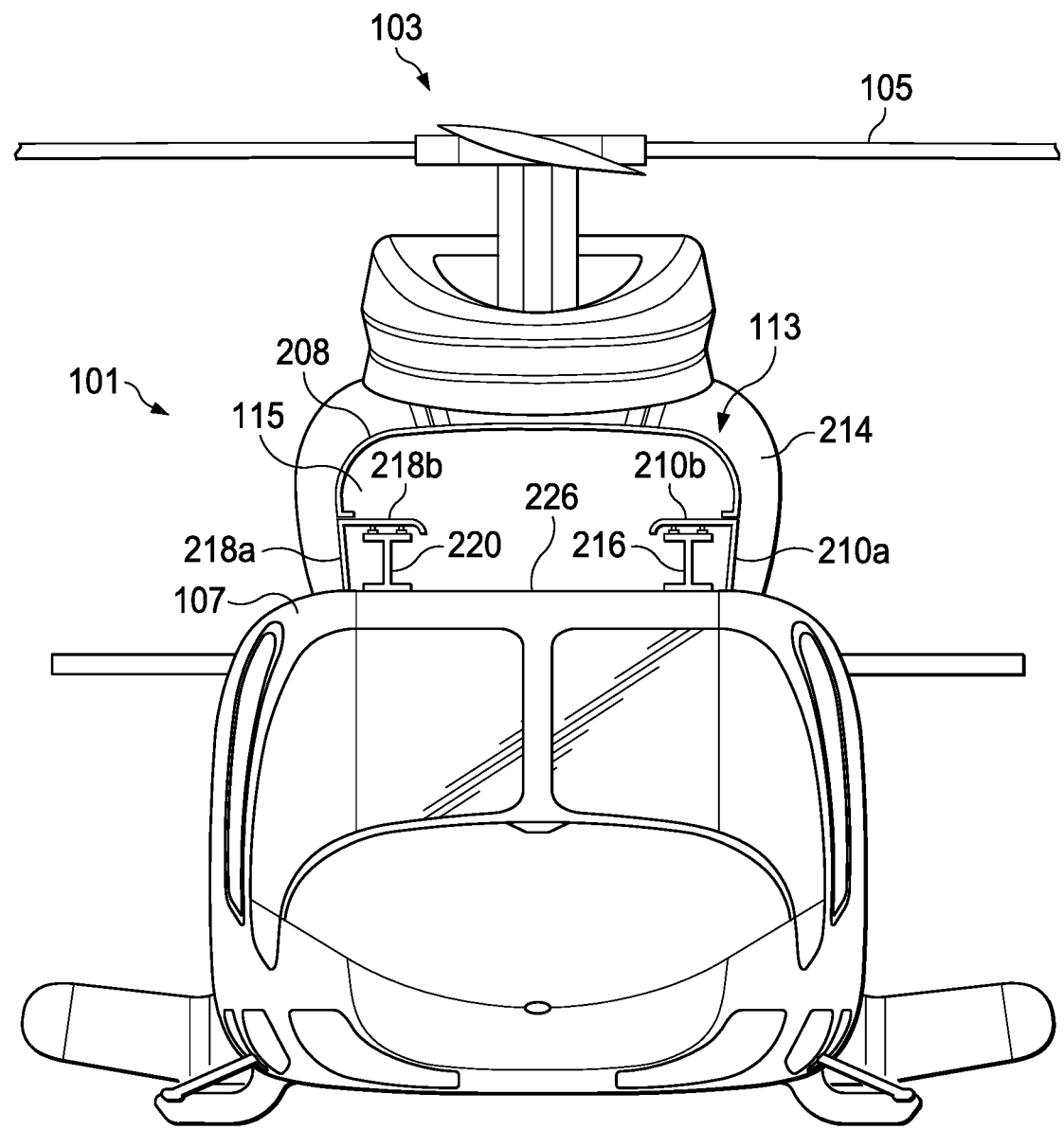

FIGS. 1A, 1B, and 1C illustrate an example embodiment of a rotorcraft 101. FIG. 1A illustrates a side view of the rotorcraft 101, while FIG. 1B illustrates a perspective view of the rotorcraft 101 and FIG. 1C illustrates a front, partially cutaway view of the rotorcraft 101. Rotorcraft 101 includes a rotor system 103 with a plurality of rotor blades 105. The pitch of each rotor blade 105 can be managed or adjusted in order to selectively control direction, thrust, and lift of the rotorcraft 101. Rotorcraft 101 further includes a fuselage 107, tail rotor or anti-torque system 109, an empennage 111, and a tail structure 120. In the illustrated embodiment, tail structure 120 may be used as a horizontal stabilizer. Torque is supplied to rotor system 103 and anti-torque system 109 using at least one engine. The rotorcraft 101 includes a variety of fairing and/or cowling assemblies configured to cover or protect components of the rotorcraft and reduce aerodynamic drag. One example cowling assembly 113 is arranged forward of an unillustrated engine and may cover and protect, for example, an environmental control unit (ECU). Fairings and cowlings provide a relatively smooth outer surface that reduces aerodynamic drag experienced by the rotorcraft 101. The terms "cowling" and "fairing" are used interchangeably in the present disclosure.

It should be appreciated that rotorcraft 101 of FIGS. 1A, 1B, and 1C are merely illustrative of a variety of aircraft that can be used to implement embodiments of the present disclosure. Other aircraft implementations can include, for example, tiltrotor aircraft, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Turning to FIG. 1C, FIG. 1C illustrates a front, partially cutaway view of the rotorcraft 101. In FIG. 1C, only the cowling assembly 113 is cutaway; the remainder of the rotorcraft 101 is shown in a front view. The cowling assembly 113 is affixed to a top 226 of the fuselage 107. The cutaway portion of FIG. 1C illustrates, among other things, roof beams 220 and 216, which are critical structural components of the rotorcraft 101. Each of the roof beams 220 and 216 supports the fuselage 107 by transferring loads between the rotor system 103 and the fuselage 107.

The cowling assembly 113 comprises fairings 204 (not shown in FIG. 1C), 208, 214, 210 (comprising portions 210a and 210b) and 218 (comprising portions 218a and 218b). Each of the fairings 204, 210, 214, and 218 are affixed, for example by using mechanical fasteners or an adhesive, to a top section 226 of the fuselage 107; the fairing 208 is hinged to the fairing 204 and is moveable between an open position and a closed position. In the example of FIG. 1C, the fairing 208 is in the closed position (and is locked with a locking mechanism). When the fairing 208 is in the closed position, the fairing assembly encloses a compartment 115. The compartment 115 houses the ECU, at least a portion of the roof beams 220 and 216, as well as other components. The fairing 208 can be opened (i.e., moved to the open position) to enable access to the components in the compartment 115, for example, for inspection and maintenance.

Because the fairing 208 provides access to the components in the compartment 115, an area in and around the compartment 115 will experience frequent foot traffic. Such foot traffic can potentially damage components of the rotorcraft 101. For example, a person accessing the compartment 115 may damage the roof beams 220 and 216, which would reduce the structural integrity and fatigue life of the roof beams 220 and 216. Such damage may comprise, e.g., gouges and/or deformations in the roof beams caused by dropping items (e.g., tools, replacement parts, and the like) on the roof beams or scratches in and/or thinning of flanges of the roof beams caused by abrasive debris in a shoe or boot. One potential solution is to add a separate, independent piece to cover each of the roof beams 220 and 216. However, doing so would increase the complexity and the part count on the rotorcraft 101. Accordingly, there is a need for a solution that not only protects the roof beams 220 and 216 but also maintains simplicity so as to not increase the complexity of components in and assembly of the rotorcraft 101.

A solution disclosed herein is a cowling/fairing integrated with a bearing surface that extends from an outer mold line surface to serve as a step and to protect a structural member of an aircraft.

The embodiments described throughout this disclosure address the above challenges (and others) and provide numerous technical advantages, including protecting a component of a rotorcraft with a single component that provides an outer mold line surface and a bearing surface. For example, each of the fairings 210 and 218 comprises an outer mold line portion (OML portion) that is part of an outer mold line (OML) of the rotorcraft 101 (i.e., portions 210a and 218a, respectively) and a bearing portion for stepping and/or walking on to access the compartment 115 (i.e., portions 210b and 218b, respectively). Each of the OML portions 210a and 218a is an aerodynamic portion that helps reduce drag on the rotorcraft. Both the OML portion and the bearing portion protect a roof beam. The bearing portions 210b and 218b extend inboard into the compartment 115.

Example embodiments that may be used to protect a component of a rotorcraft with a single fairing that provides as an outer mold line surface and a bearing surface are described below with more particular reference to the remaining Figures.

Figure 2:
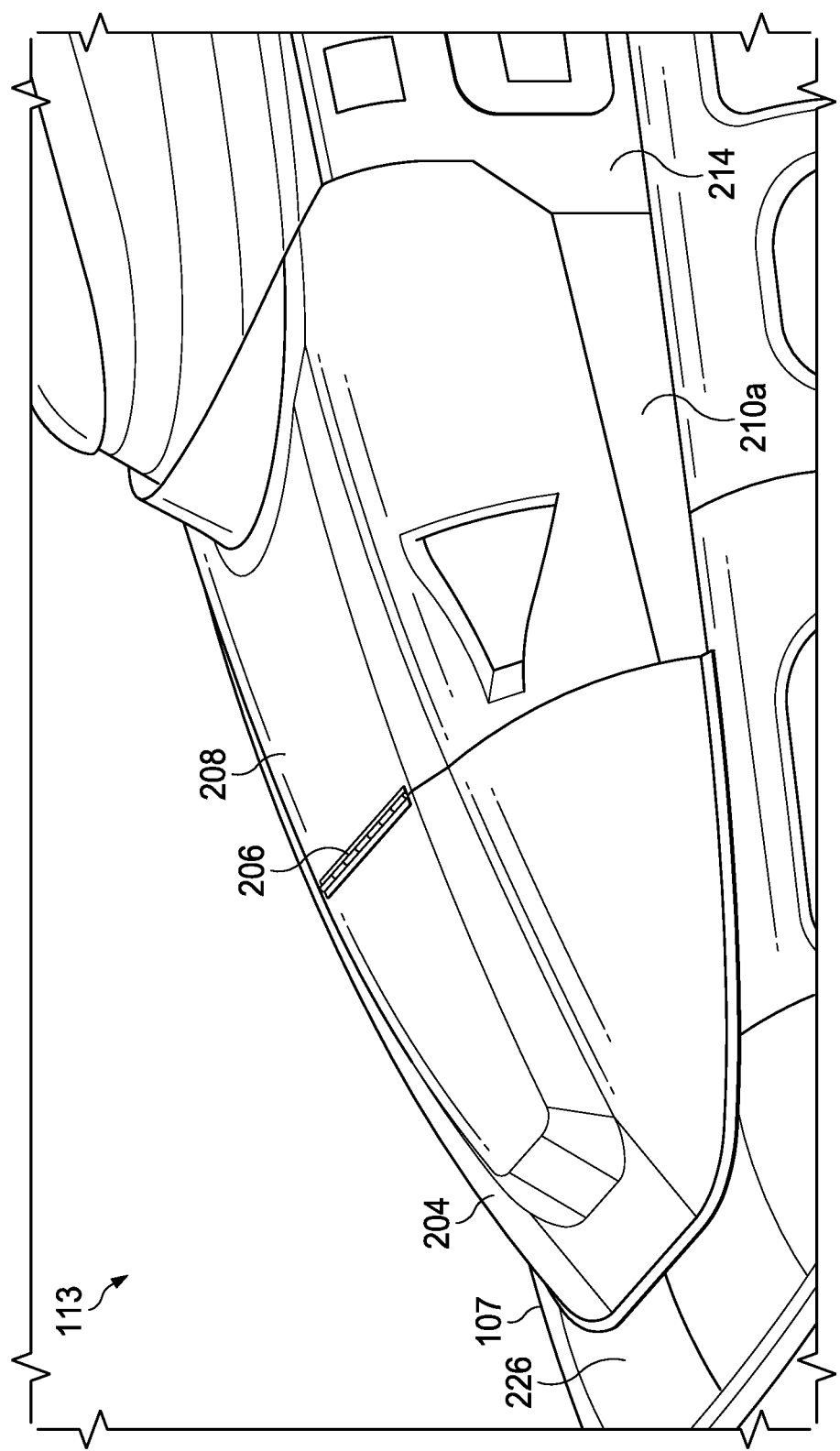
FIGS. 2 and 3 illustrate isometric views of a cowling assembly including an example fairing comprising an outer mold line surface and a bearing surface in accordance with certain embodiments.
Figure 3:
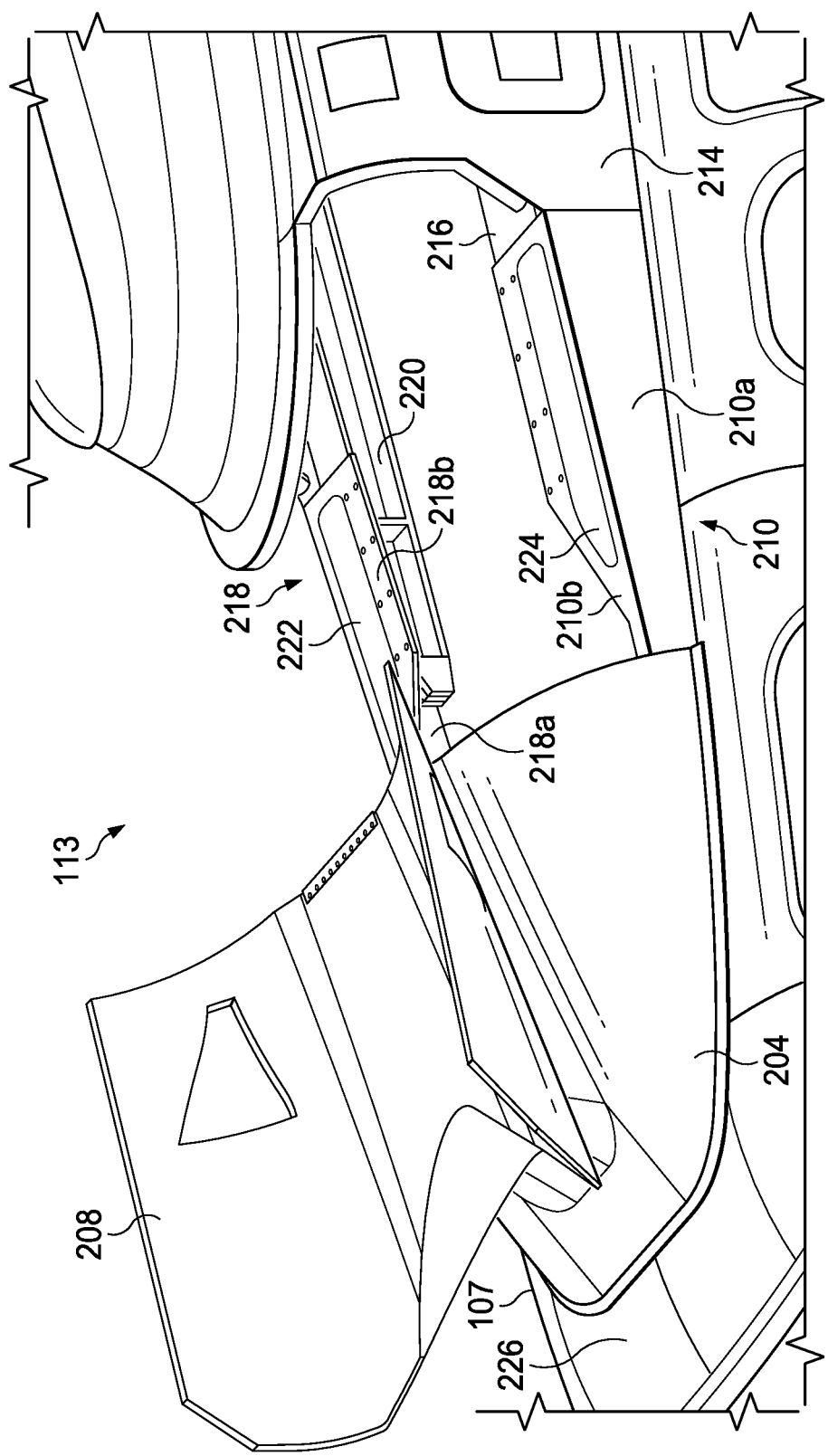

FIGS. 2 and 3 illustrate isometric views of the cowling assembly 113 including an example fairing comprising an outer mold line portion and a bearing portion. The cowling assembly 113 comprises fairings 204, 208, 210, 214, and 218. Each of the fairings 204, 210, 214, and 218 are affixed, for example by mechanical fasteners or an adhesive, to a top section 226 of the fuselage 107. The fairing 208 is attached to the fairing 204 by a hinge 206. The fairing 208 is pivotable about the hinge 206 between an open position and a closed position. Each of the fairings 210 and 218 comprise an outer mold line portion (i.e., portions 210a and 218a, respectively) and a bearing portion (i.e., portions 210b and 218b, respectively). Each OML portion comprises a fairing surface that operates as an outer mold line surface of the rotorcraft 101. Each bearing portion comprises a bearing surface configured to receive foot traffic (e.g., stepping and/or walking on) associated with accessing the compartment 115. Each bearing portion can support a load equal to or greater than the full weight of one or more people stepping on its surface. The load for a person stepping on the bearing portion is estimated based on a 200-pound person and multiplied by a safety factor of about 1.5 or 2.0 (e.g., to account for an impulse load (dynamic loading) created by the person actively stepping or walking on the surface). The load is applied in an area estimated based on a size of the person's foot (e.g., 3-inch square area, or 9 in$^2$). For example, using the safety factor of 1.5, the load is 300 pounds in a 3-inch square area, or about 33.3 pounds per square inch (psi). Alternatively, using the safety factor of 2.0, the load is 400 pounds in a 3-inch square area, or about 44.4 psi. Thus, the bearing portion can, advantageously, support at least 33 psi (e.g., applied over any 3-inch square area of its surface and/or over its entire top surface). The fairing 210 protects the roof beam 216 and the fairing 218 protects the roof beam 220.

Fairings and cowlings disclosed herein may be made of a metal, such as steel or aluminum, or a metal alloy, such as an aluminum alloy. Alternatively, fairings and cowlings disclosed herein may be made of a nonmetallic material, such as reinforced plastics and advanced composites (e.g., carbon fiber reinforced polymer (CFRP)). Carbon fiber reinforced polymers have the advantage of high strength-to-weight ratio, modulus (stiffness to density ratio) 3.5 to 5 times that of steel or aluminum, longer life than metals, higher corrosion resistance, tensile strength 4 to 6 times that of steel or aluminum, and greater design flexibility. Furthermore, the bonded construction of composites such as CFRP can reduce the number joints and fasteners for each component, making these components easy to repair. Accordingly, fairings and cowlings constructed from composites will be lighter and, in spite of the reduced weight, will be stronger than comparable components made from aluminum alloys and other metals.

Turning to FIG. 2, FIG. 2 illustrates the fairing 208 in the closed position. While in the closed position, the contiguous exterior surfaces of each of the fairings 204, 208, 210, 214, and 218 (not visible in FIG. 2) complete the outer mold line surface of the cowling assembly 113 and, more broadly, complete the outer mold line surface of the rotorcraft 101. Thus, the outer mold line portions 210a and 218a (of fairing 210 and 218, respectively) provide a portion of the total outer mold line of the rotorcraft 101. In addition, the OML portions 210a and 218a protect a side of the roof beams 220 and 216, respectively (e.g., from damage resulting directly or indirectly from foot traffic). In the closed position, the fairing 208 completes the outer mold line of the rotorcraft 101 based on the fairing 208 and the OML portions 210a and 218a abutting one another. In addition, the fairing 208 being in the closed position, in part, defines a compartment (i.e., compartment 115 as illustrated in FIG. 1C) in which the bearing portions 210b and 218b are concealed. The fairing 208 may be releasably secured to adjacent fairings (i.e., any one or more of the fairings 204, 210, and 214) by a locking mechanism when closed.

Figure 4:
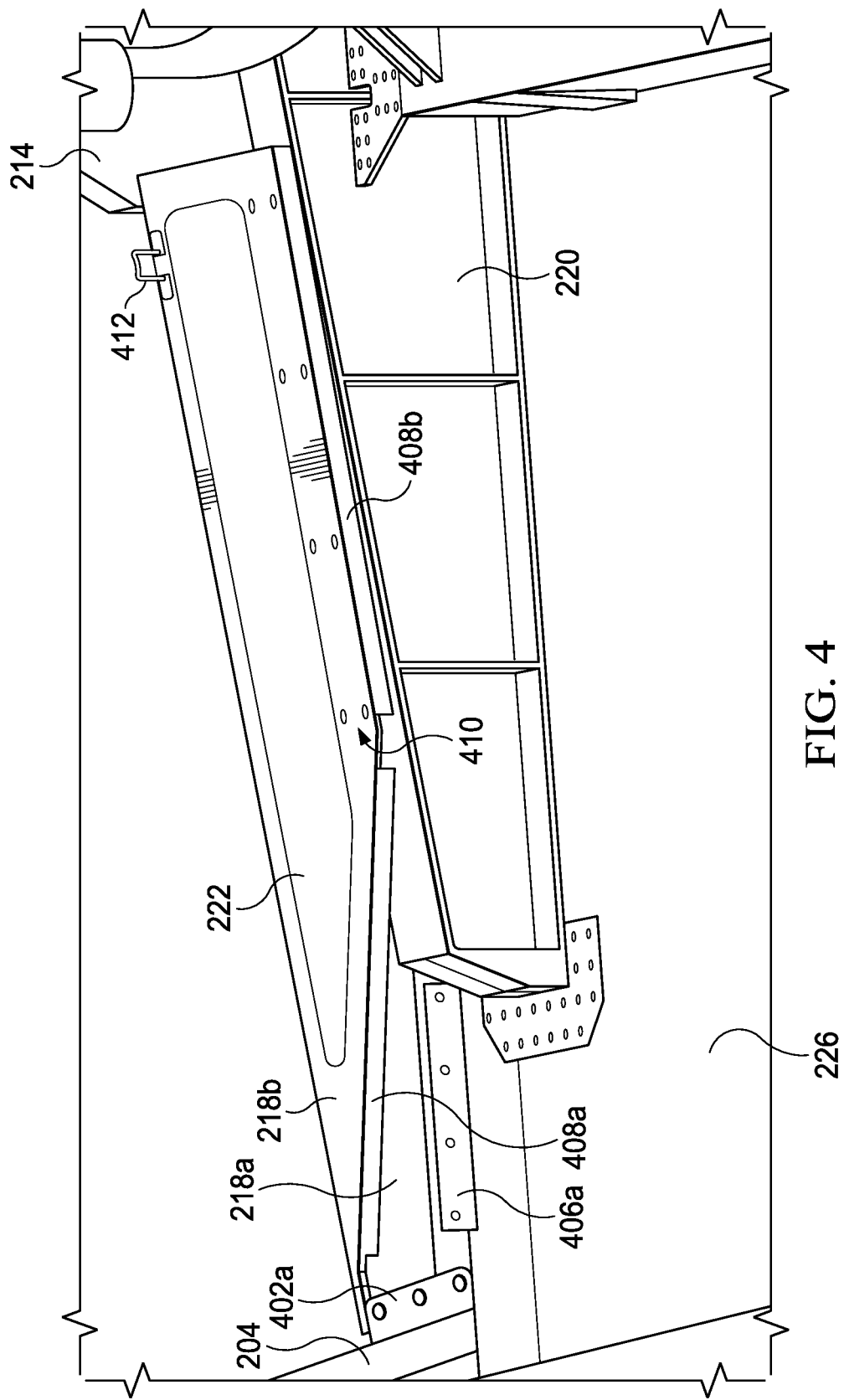
FIG. 4 illustrates another isometric view of the cowling assembly including the example fairing of FIG. 3.

Turning to FIG. 3, FIG. 3 illustrates the fairing 208 in the open position, which enables access to the compartment. The fairing 208 being moved to the open position disconnects the outer mold line of the rotorcraft 101 by partially separating the fairing 208 from the OML portions 210a and 218a, respectively), which exposes the bearing portions 210b and 218b (i.e., based on the fairing 208 and the OML portions being noncontiguous in the open position). Each of the bearing portions 210b and 218b extend in an inboard direction into the compartment in which a portion of the roof beams 220 and 216 are located. The bearing portions protect the portions of the roof beams from damage resulting from foot traffic around the compartment. For example, the bearing portion 210b shields a top of the roof beam 216 and the bearing portion 218b shields a top of the roof beam 220. A strip of material is attached to a top surface of the bearing portions. The top surface may be very smooth and, as a result, slippery. Moreover, the fairings 210 and 218 taper in height and width, which creates a slight slope that could exacerbate such slipperiness. Thus, in some embodiments, the material is a friction material that increases a friction coefficient of the top surface of the bearing portion and, thereby, reduces the likelihood of a person slipping while stepping on the bearing portion. The material also protects the bearing portion from being directly exposed to sources of damage (e.g., scratches, harmful substances on soles of footwear, and the like). Friction strip 224 is applied to the bearing portion 210b and friction strip 222 is applied to the bearing portion 218b. FIG. 4 illustrates further details of the fairing 218. The fairings 210 and 218 are substantially similar to one another (e.g., mirrored versions of one another as shown in FIG. 1C). Thus, the details described below with respect to the fairing 218 are equally applicable to the fairing 210.

FIG. 4 illustrates another isometric view of a portion of the cowling assembly 113 including the fairing 218 of FIG. 3. Many of the components of the cowling assembly 113 are described above and are not repeat here only for brevity. The fairing 218 comprises the outer mold line portion (OML portion) 218a and the bearing portion 218b. A locking mechanism 412 is attached to a top surface of the bearing portion 218b. The locking mechanism 412 is to secure the fairing 208 to the fairing 218 when closed.

The fairing 218 is attached to the top section 226 of the fuselage and to adjacent fairings by one or more attachment mechanisms. Brackets 406a and 406b (406b is not visible in FIG. 4) attach the OML portion 218a of the fairing 218 to the top section 226 of the fuselage. In other examples, the brackets 406a and 406b may attach the fairing 218 to any other location capable of supporting its loads. Plate 402a attaches the OML portion 218a of the fairing 218 to the fairing 204. Plate 402b (not visible in FIG. 4) attaches the OML portion 218a of the fairing 218 to the fairing 214. The brackets 406a and 406b and the plates 402a and 402b affix the fairing 218 to the top section 226 of the fuselage in a fixed position relative to other components on the rotorcraft. Some dimensions of the fairing 218 vary (e.g., taper), as is described further below. The thickness, however, is substantially constant across the fairing 218.

Fillets are located at an edge of the bearing portion 218b opposite the OML portion 218a. The bearing portion 218b tapers; a portion is substantially triangular while another portion is substantially rectangular. Fillet 408a is located along an edge of the tapered, triangular portion of the bearing portion 218b. Fillet 408b is located along an edge of the rectangular portion of the bearing portion 218b. Each of the fillets 408a and 408b increases stiffness of the bearing portion 218b, which can advantageously increase the maximum load that it can support (i.e., relative to being non-stiffened). In addition, each of the fillets 408a and 408b produces a softened (e.g., non-sharp) edge, which can reduce the likelihood of injury (e.g., in case of a person falling) and damage to footwear. Moreover, the fillets 408a and 408b provide a drip edge for liquids. In this example, the fillets are relatively short and only extend slightly below the elevation of the bearing portion 218b. However, in other examples, the fillet edge can be extended to make the fairing 218 "U" shaped and at least partially enclose and provide further protection to the roof beam 220.

The bearing portion 218b of the fairing 218 is supported by the roof beam 220. Each of a set of studs 410 transfers load from the bearing portion 218b to the roof beam 220. The set of studs distributes loads across a larger area of the roof beam 220 than if the load had come into direct contact with the roof beam 220 and, thereby, reduces the stress (e.g., load per unit area) imposed on the roof beam 220. This reduces the likelihood that impact loads (e.g., caused by dropping items like tools, replacement parts, and the like) will gouge material from and/or cause permanent deformation to the roof beam 220, which could reduce its structural integrity and fatigue life. In addition, the bearing portion 218b protects the roof beam 220 from abrasion which, over time, could thin flanges of the roof beam 220 and reduce its structural integrity. Thus, the bearing portion 218b acts as a protective, and potentially sacrificial, covering that can prevent degradation and fatigue of the roof beam 220 due to foot traffic.

Figure 5C:
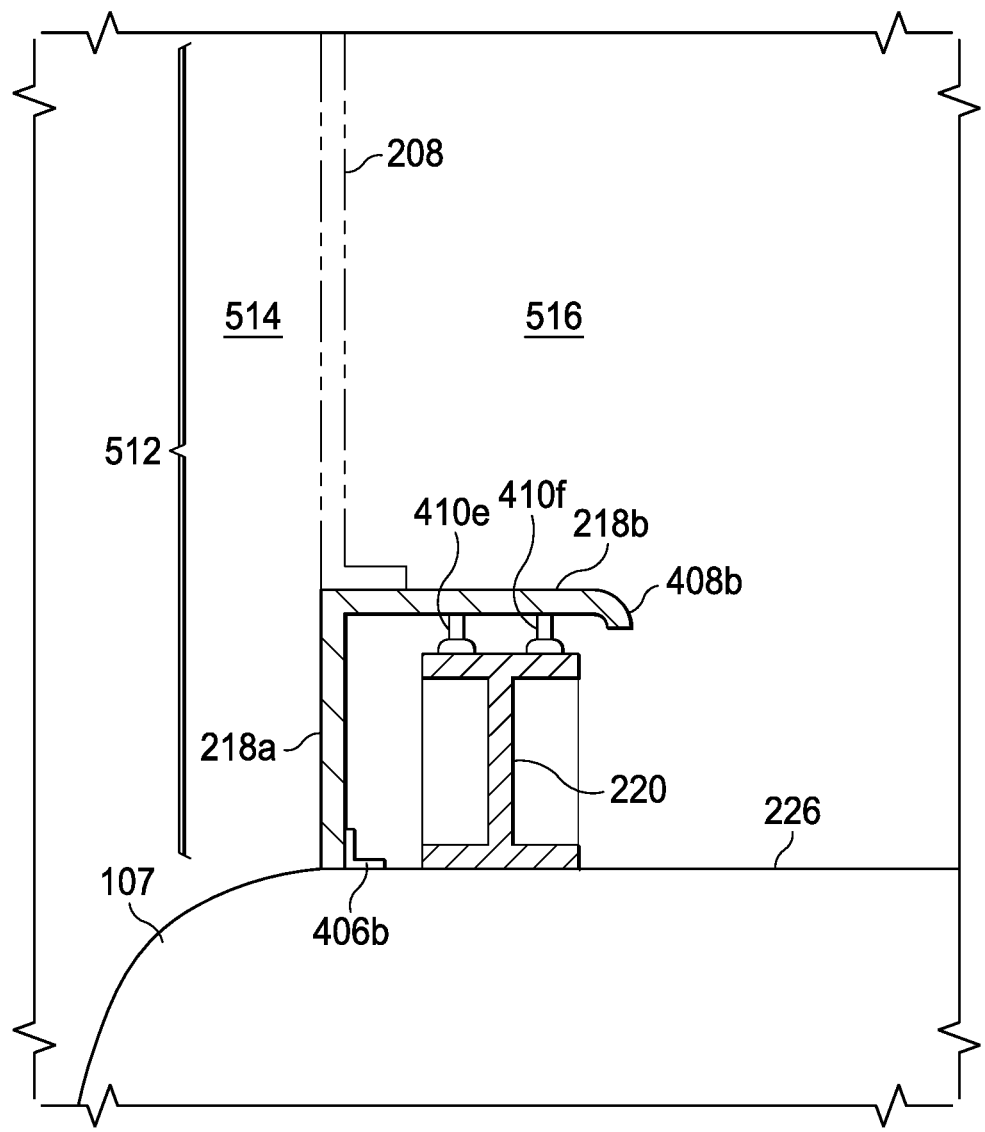

FIGS. 5A, 5B, and 5C illustrate further details of the fairing 218. FIG. 5A is a side view of the portion of the cowling assembly 113 of FIG. 4. FIG. 5B is a top view of the portion of the cowling assembly 113. FIG. 5C is a cross section of the portion of the cowling assembly 113. The cross section of FIG. 5C is cut along a line as generally indicated by the lines labeled "5C" in FIGS. 5A and 5B. Again, many of the components of the cowling assembly 113 are described above and are not repeat here only for brevity. Brackets 406a and 406b attach the outer mold line portion (OML portion) 218a to the top section 226 of the fuselage. Plate 402a attaches the OML portion 218a of the fairing 218 to the fairing 204. Plate 402b attaches the OML portion 218a of the fairing 218 to the fairing 214. The set of studs 410 comprises studs 410a, 410b, 410c, 410d, 410e, 410f, 410g, and 410h (collectively referred to as studs 410a-h or studs 410). Each of the studs 410 transfers load from the bearing portion 218b to the roof beam 220. This example utilizes eight studs distributed across a portion of the roof beam 220. In general, larger numbers of studs more evenly better distribute the load from the bearing portion 218b to the roof beam 220 than smaller numbers of studs. However, smaller numbers of studs may be used based on whether, e.g., space, weight, and part count constraints for the rotorcraft require doing so. The OML portion 218a tapers in height. One end of the OML portion 218a is a first height (i.e., labeled 506 in FIG. 5A). Another end of the OML portion 218a is a second height (i.e., labeled 502 in FIG. 5A). The OML portion 218a tapers from the first height 506 to the second height 502. The first height 506 is greater than the second height 502. In this particular example, the second height 502 is about 50 percent less than the first height 506. As a further example, the second height 502 is about 4.6 inches and the first height 506 is about 8.9 inches. The bearing portion 218b tapers in width. A portion is substantially rectangular and has a width (i.e., labeled 508 in FIG. 5B) that is constant. In this particular example, the width 508 is about 20 percent more than the first height 506. As a further example, the width 508 is about 10.77 inches. Another triangular portion of the bearing portion 218b tapers from the width 508 down to only the thickness of the material from which the fairing 218 is made.

Turing to FIG. 5C, FIG. 5C illustrates a cross section through the fairing 218, a portion of the fairing 208, the roof beam 220, and the fuselage 107. The cross section illustrates the OML portion 218a, the bearing portion 218b and, the fillet 408b of the fairing 218. The bracket 406b attaches the OML portion 218a to the top section 226 of the fuselage 107. The studs 410e and 410f transfers load from the bearing portion 218b to the roof beam 220.

An outer surface of the OML portion 218a is contiguous with an outer surface of the fairing 208 and, together, they create a portion of an outer mold line 512 of the rotorcraft. The outer mold line 512 lies on an outboard side 514 while the other components of the cross section line on an inboard side 516. The OML portion 218a provides a portion of the outer mold line 512 of the rotorcraft. When the rotorcraft is in flight, the OML portion 218a helps reduce aerodynamic drag experienced by the aircraft (e.g., by creating a relatively smooth outer surface that is collinear with the outer surface of the fairing 208).

The bearing portion 218b extends from the OML portion 218a in a direction toward the inboard side 516. The bearing portion 218b is continuous with the OML portion 218a (i.e., a single, unbroken piece). Thus, there is no joint that requires fasteners to attach bearing portion 218b and the OML portion 218a. The OML portion 218a and the bearing portion 218b being a single piece reduces complexity, reduces number of parts, and simplifies installation for the rotorcraft on which the fairing 218 is installed. Alternatively, the portions may be separate, e.g., if space constraints make such separation necessary for installation. Because bearing portion 218b and the OML portion 218a are also continuous, a "corner" between the portions provides structural support (i.e., resistance to bending force) to shield the roof beam 220. The bearing portion 218b and the OML portion 218a are fixed at a relative angle to one another and are non-collinear. In this example, the relative angle is a right angle (i.e., 90 degrees measured between the centerlines of the bearing portion 218b and the OML portion 218a). In other embodiments, the relative angle may be an oblique angle. The bearing portion 218b has a dual purpose of being a step in addition to protecting the roof beam 220.

Each of the OML portion 218a and the bearing portion 218b shields a portion of the roof beam 220. This protection increases the lifespan of the beam and maintain its structural integrity. The fairing 218 provides protection in more than one direction. For example, the bearing portion 218b shields the roof beam 220 along its top (i.e., a first direction). The OML portion 218a shields the roof beam 220 along its side (i.e., a second direction).

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A fairing for a rotorcraft, the fairing comprising:
a stationary fairing comprising:
an outer mold line (OML) portion configured to provide at least a portion of an outer mold line of the rotorcraft;
a bearing portion extending from the OML portion, wherein the OML portion and the bearing portion shield a portion of a structural member;

wherein the structural member comprises a beam configured to support loads from a portion of an airframe of the rotorcraft and a plurality of studs for transferring loads from the bearing portion to the beam and distributing the transferred loads across the beam; and wherein the fairing further comprises a hinged fairing pivotable between an open position and a closed position.

2. The fairing of claim 1, wherein the bearing portion is continuous with the OML portion.

3. The fairing of claim 1, wherein the bearing portion extends into a compartment of the rotorcraft in which the portion of the structural member is located.

4. The fairing of claim 1, wherein the bearing portion is configured to protect the portion of the structural member from damage resulting from foot traffic associated with accessing the compartment.

5. The fairing of claim 1, further comprising a strip of friction material attached to the bearing portion.

6. The fairing of claim 1, further comprising a fillet located at an edge of the bearing portion opposite the OML portion.

7. The fairing of claim 1, wherein the OML portion and the bearing portion shielding the portion of the structural member comprises:
- the bearing portion being configured to shield the structural member from a first direction; and
- the OML portion being configured to shield the structural member from a second direction.

8. The fairing of claim 1, wherein the bearing portion is supported, at least in part, by the structural member.

9. The fairing of claim 1, further comprising: an attachment mechanism configured to attach the fairing to the rotorcraft.

10. A rotorcraft comprising:
- an airframe defining an outer mold line (OML) of the rotorcraft; and
- a cowling assembly comprising a hinged fairing, the hinged fairing being pivotable between an open position and a closed position and comprising:
- a stationary fairing comprising:
  - an OML portion configured to provide at least a portion of the OML of the rotorcraft, and
  - a bearing portion extending from the OML portion, wherein the OML portion and the bearing portion shield a portion of a structural member;

wherein the structural member comprises a beam configured to support loads from a portion of an airframe of the rotorcraft and a plurality of studs for transferring loads from the bearing portion to the beam and distributing the transferred loads across the beam.

11. The rotorcraft of claim 10, wherein the bearing portion is continuous with the OML portion.

12. The rotorcraft of claim 10, further comprising:
- wherein the hinged fairing, in the closed position, is configured to: connect the OML of the rotorcraft and conceal the bearing portion of the fairing based on the hinged fairing and the OML portion of the fairing being contiguous; and
- wherein the hinged fairing, in the open position, is configured to: disconnect the outer mold line of the rotorcraft and expose the bearing portion of the fairing based on the cowling and the OML portion of the fairing being noncontiguous.

13. The rotorcraft of claim 12, wherein the cowling assembly, at least in part, defines a compartment of the rotorcraft in which the portion of the structural member is located, and the bearing portion extends into the compartment.

14. The rotorcraft of claim 13, wherein the bearing portion is configured to protect the portion of the structural member from damage resulting from foot traffic associated with accessing the compartment.

15. The rotorcraft of claim 10, further comprising a strip of friction material attached to the bearing portion.

16. The rotorcraft of claim 10, further comprising a fillet located at an edge of the bearing portion opposite the OML portion.

17. The rotorcraft of claim 10, wherein the OML portion and the bearing portion shielding the portion of the structural member comprises:
- the bearing portion being configured to shield the structural member from a first direction; and
- the OML portion being configured to shield the structural member from a second direction.

18. The rotorcraft of claim 10, wherein the bearing portion is supported, at least in part, by the structural member.

19. The rotorcraft of claim 10, further comprising: an attachment mechanism configured to attach the fairing to the rotorcraft.

* * * * *